US008555385B1

(12) United States Patent
Bhatkar et al.

(10) Patent No.: US 8,555,385 B1
(45) Date of Patent: Oct. 8, 2013

(54) TECHNIQUES FOR BEHAVIOR BASED MALWARE ANALYSIS

(75) Inventors: Sandeep B. Bhatkar, Los Angeles, CA (US); Susanta Nanda, Los Angeles, CA (US); Jeffrey Scott Wilhelm, Venice, CA (US)

(73) Assignee: Symantec Corporation, Mountian View, CA (US)

( * ) Notice: Subject to any disclaimer, the term of this patent is extended or adjusted under 35 U.S.C. 154(b) by 128 days.

(21) Appl. No.: 13/047,338

(22) Filed: Mar. 14, 2011

(51) Int. Cl.
*G06F 21/22* (2006.01)
*G06F 11/36* (2006.01)

(52) U.S. Cl.
USPC .............................................. 726/22; 726/25

(58) Field of Classification Search
None
See application file for complete search history.

(56) References Cited

U.S. PATENT DOCUMENTS

| 7,356,736 | B2 | 4/2008 | Natvig | |
|---|---|---|---|---|
| 2006/0101413 | A1* | 5/2006 | Kinno et al. | 717/127 |
| 2006/0259967 | A1* | 11/2006 | Thomas et al. | 726/22 |
| 2010/0031353 | A1* | 2/2010 | Thomas et al. | 726/22 |
| 2010/0212013 | A1* | 8/2010 | Kim et al. | 726/23 |

OTHER PUBLICATIONS

Norman SandBox Web Page, Retrieved on Jun. 1, 2011 at: http://www.norman.com/products/sandbox_malware_analyzers/en-us.
GFI Sandbox (formerly CW Sandbox) Web Page, Retrieved on Jun. 1, 2011 at: http://www.gfi.com/malware-analysis-tool/.
GFI Sandbox—Automated Analysis Tool Web Page Retrieved on Jun. 1, 2011 at: http://www.gfi.com/malware-analysis-tool/.
iDefense SysAnalyzer Web Page, Retrieved on Jun. 1, 2011 at: http://www.labs.idefense.com/software/malcode.php.
Anubis: Analyzing Unknown Binaries Web Page Retrieved on Jun. 1, 2011 at: http://www.anubis.iseclab.org/?action=home.
ThreatExpert Web Page, Retrieved on Jun. 1, 2011 at: http://www.threatexpert.com.
Joe Security Web Page, Retrieved on Jun. 1, 2011 at: http://www.joesecurity.org.
Bayer, et al., "A view on Current Malware Behaviors", Insights into Current Malware Behavior, 2nd USENIX Workshop on Large-Scale Exploits and Emergent Threats (LEET), Boston, MA, Apr. 2009, http://www.iseclab.org/papers/leet-anubis_stats.pdf, 11 pages.
Joe Sandbox 5.0.0, Automated Malware Analysis Blog, http://joe4security.blogspot.ch/2013_03_01_archive.html, Mar. 23, 2012. 2 pages.
Malware Analysis System, CWSandbox::Technical Details, https://mwanalysis.ort/?site=1&page=techdetails, accessed on Apr. 30, 2013, 1 page.
ThreatExpert: System Overview, http://www.threatexpert.com/overview.aspx, accessed May 7, 2013, Copyright 2009, 2 pages.
VerisignInc.com, "Verisign iDefense Security Intelligence Services", Data Sheet, May 2012, 2 pages.

* cited by examiner

*Primary Examiner* — Venkat Perungavoor
(74) *Attorney, Agent, or Firm* — Wilmer Cutler Pickering Hale and Dorr LLP (57) ABSTRACT

Techniques for behavior based malware analysis are disclosed. In one particular exemplary embodiment, the techniques may be realized as a method for behavior based analysis comprising receiving trace data, analyzing, using at least one computer processor, observable events to identify low level actions, analyzing a plurality of low level actions to identify at least one high level behavior, and providing an output of the at least one high level behavior.

19 Claims, 7 Drawing Sheets

| | |
|---|---|
| Sample | Trojan-Dropper.Win32.ExeBinder.d |
| High-level behavior | A thread was injected in the already running system process 'explorer.exe'. |
| Behavior rule | mbs_injectedSysProcess(sysprocess(explorer.exe)) |
| APIs involved | 1. api_Process32Next(4097, [296, 0, 1588, 0, 0, 16, 1552, 8, 0, explorer.exe], 1))<br>2. api_OpenProcess(2035711, 0, 1588, 4098))<br>3. api_WriteProcessMemory(4098, 14876672, [67, 58, 92, 87, 73, 78, 68, 79, 87, 83, 92, 87, 105, 110, 100, 111, 119, 115, 51, 50, 46, 68, 76, 76, 0, 0, 0, 0, 42, 0, 0, 1, 0, 0, 0, 24, 0, 0, 0, 67, 58, 92, 87, 73, 78, 68, 79, 87, 83, 92, 87, 105, 110, 51, 50, 72, 79, 75, 46, 68, 76, 76, 0, 0, 0, 0, 168, 11, 49, 2, 168, 11, 49, 2, 24, 7, 0, 0, 69, 88, 80, 76, 79, 82, 69, 82, 46, 69, 88, 69, 0, 0, 0, 0, 196, 11, 49, 2, 196, 11, 49, 2, 116, 0, 0, 0, 69, 88, 80, 76, 79, 82, 69, 82, 46, 69, 88, 69, 28, 0, 0, 0, 23, 0, 0, 0, 0, 0, 0, 6, 0, 0, 0, 83, 121, 115, 116, 48, 0, 0, 0, 23, 0, 0, 0, 0, 0, 0, 6, 0, 0, 0, 83, 121, 115, 116, 68, 0, 0, 0, 23, 0, 0, 0, 0, 0, 0, 6, 0, 0, 0, 83, 121, 115, 116, 88, 0, 0, 0, 31, 0, 0, 0, 0, 0, 0, 12, 0, 0, 0, 69, 88, 80, 76, 79, 82, 69, 82, 46, 69, 88, 69, 144, 0, 0, 0, 27, 0, 0, 0, 0, 0, 0, 8, 0, 0, 0, 115, 109, 115, 115, 46, 101, 120, 101, 168, 0, 0, 0, 27, 0, 0, 0, 0, 0, 0, 8, 0, 0, 0, 115, 115, 109, 115, 46, 101, 120, 101, 192, 0, 0, 0], 4096, 4096, 1))<br>4. api_CreateRemoteThread(4098, 0, 2088770935, 14876672, 0, 788, 17548)) |

TECHNIQUES FOR BEHAVIOR BASED MALWARE ANALYSIS

FIELD OF THE DISCLOSURE

The present disclosure relates generally to behavior based analysis and, more particularly, to techniques for behavior based malware analysis.

BACKGROUND OF THE DISCLOSURE

Malware threats continue to grow in a large part due to polymorphic and metamorphic threats (e.g., malware variants with the same behavior but a different signature). Due to the increase in malware variants, behavior based analysis may be used to identify variants that may have similar effects and/or may be handled with similar security measures. However, analyzing behavior may be difficult for several reasons. Malware may perform a large number of low level system calls. Low level system calls contain a large amount of information. It may be difficult to isolate and/or identify behavior from low level system calls due to their complexity and the large number of calls. Furthermore, malware may perform one or more obfuscation techniques such as using child processes, process injection, and the use of operating system utilities to instantiate malware.

In view of the foregoing, it may be understood that there may be significant problems and shortcomings associated with current behavior based malware analysis technologies.

SUMMARY OF THE DISCLOSURE

Techniques for behavior based malware analysis are disclosed. In one particular exemplary embodiment, the techniques may be realized as a method for behavior based analysis comprising receiving trace data, analyzing, using at least one computer processor, observable events to identify low level actions, analyzing a plurality of low level actions to identify at least one high level behavior, and providing an output of the at least one high level behavior.

In accordance with other aspects of this particular exemplary embodiment, analyzing observable events may comprise analyzing low level Application Programming Interface calls using at least one rule to identify a low level action performed by a low level Application Programming Interface call.

In accordance with further aspects of this particular exemplary embodiment, the observable events may comprise one or more of: system calls, execution history, API calls, a system log, a debug log, an HTTP access log, and a network activity log.

In accordance with additional aspects of this particular exemplary embodiment, analyzing a plurality of low level actions to identify at least one high level behavior may comprise using at least one rule to identify the at least one high level behavior.

In accordance with additional aspects of this particular exemplary embodiment, the techniques may further comprise automatically determining if the trace data is associated with malware based at least in part on the at least one high level behavior.

In accordance with additional aspects of this particular exemplary embodiment, the techniques may further comprise generating a signature associated with the trace data in the event the trace data is determined to be malware.

In accordance with additional aspects of this particular exemplary embodiment, the at least one high level behavior may comprise at least one of: hiding information associated with the process, stealing information, terminating security software, monitoring itself, creating a backdoor, downloading malware, executing malware, and setting up instantiations of itself.

In accordance with additional aspects of this particular exemplary embodiment, analyzing observable events may comprise identifying a context of observable events and analyzing only observable events associated with the trace data.

In accordance with additional aspects of this particular exemplary embodiment, identifying the context of observable events may provide identification of malicious behavior performed by one or more of: a non-process threat, a malware executable, a child process, and an injected thread.

In accordance with additional aspects of this particular exemplary embodiment, the context may be identified using at least one of: a process thread, a process id, a thread id, a timestamp, and one or more API arguments.

In accordance with additional aspects of this particular exemplary embodiment, identification of the context may prevent association of an operating system utility exploited by malware and may provide association of the high level behavior with a source utilizing the operating system utility.

In accordance with additional aspects of this particular exemplary embodiment, the operating system utility may comprise a utility to perform one or more of: loading a DLL, injecting a remote process thread, running an executable, running a service, and adding a program to a run registry key.

In accordance with additional aspects of this particular exemplary embodiment, the techniques may further comprise generating a proof associating one or more observable events with the identified at least one high level behavior.

In accordance with additional aspects of this particular exemplary embodiment, the techniques may further comprising generating trace data associated with execution of a process, wherein generating trace data may comprise using user level hooks to monitor execution of a suspected malware program in a safe environment, and preprocessing the trace data to provide consistent context indicators for analysis of the trace data.

In accordance with additional aspects of this particular exemplary embodiment, providing an output of the at least one high level behavior may comprise at least one of: providing a report of high level behavior, generating an alert, and generating a log entry.

In accordance with additional aspects of this particular exemplary embodiment, the techniques may further comprise further comprising matching one or more signatures of malware behavior to identify high level behavior.

In accordance with additional aspects of this particular exemplary embodiment, one or more analysis actions may be performed by at least one of: a gateway, a proxy server, a client, a service provider, and a firewall.

In accordance with additional aspects of this particular exemplary embodiment, the techniques may be realized as at least one processor readable non-transitory storage medium for storing a computer program of instructions configured to be readable by at least one processor for instructing the at least one processor to execute a computer process for performing the method.

In another particular exemplary embodiment, the techniques may be realized as an article of manufacture for behavior based analysis, the article of manufacture comprising at least one non-transitory processor readable medium, and instructions stored on the at least one medium, wherein the instructions are configured to be readable from the at least one medium by at least one processor and thereby cause the at least one processor to operate so as to receive trace data, analyze observable events to identify low level actions, analyze a plurality of low level actions to identify at least one high level behavior, and provide an output of the at least one high level behavior.

In another particular exemplary embodiment, the techniques may be realized as a system for behavior based analysis comprising one or more processors communicatively coupled to a network, wherein the one or more processors are configured to: receive trace data, analyze observable events to identify low level actions, analyze a plurality of low level actions to identify at least one high level behavior, and provide an output of the at least one high level behavior.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
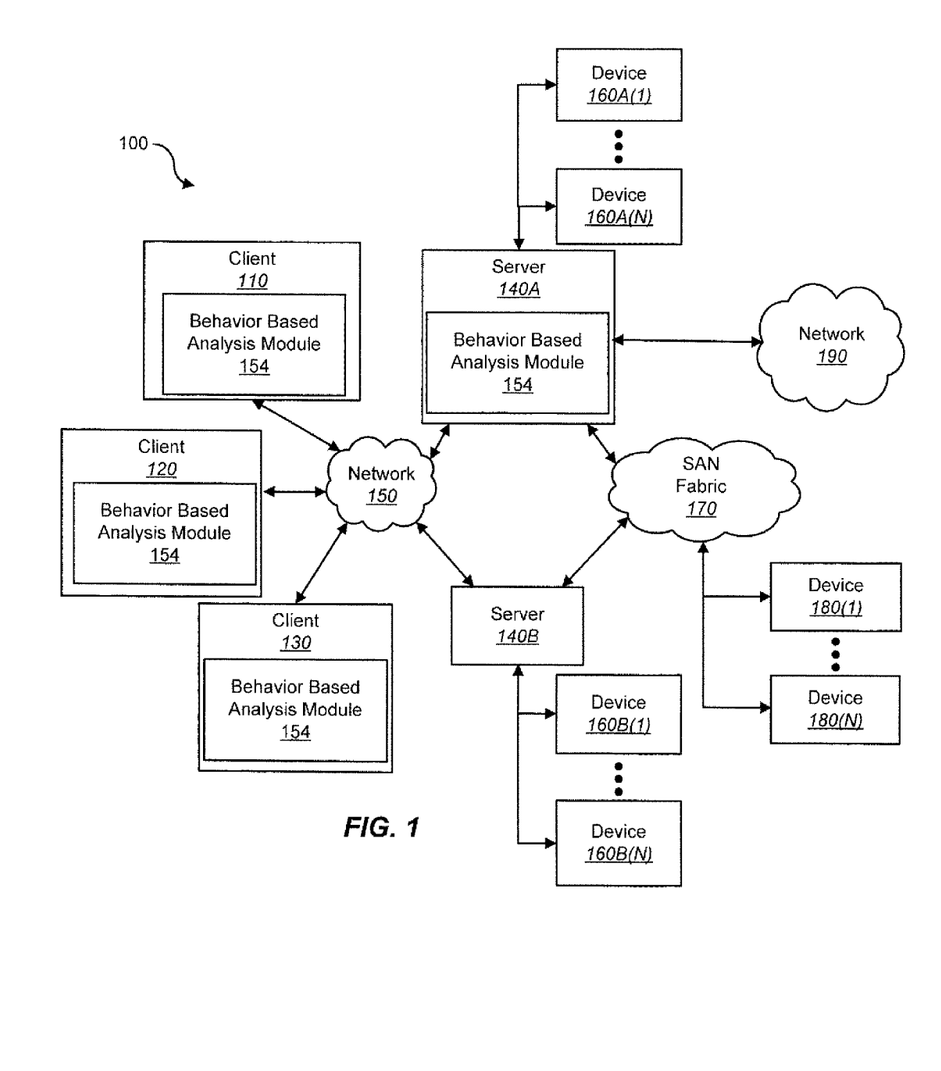
FIG. 1 shows a block diagram depicting a network architecture for behavior based malware analysis in accordance with an embodiment of the present disclosure.

FIG. 1 shows a block diagram depicting a network architecture 100 for behavior based malware analysis in accordance with an embodiment of the present disclosure. FIG. 1 is a simplified view of network architecture 100, which may include additional elements that are not depicted. Network architecture 100 may contain client systems 110, 120 and 130, as well as servers 140A and 140B (one or more of which may be implemented using computer system 200 shown in FIG. 2). Client systems 110, 120 and 130 may be communicatively coupled to a network 150. Server 140A may be communicatively coupled to storage devices 160A(1)-(N), and server 140B may be communicatively coupled to storage devices 160B(1)-(N). Servers 140A and 140B may contain a management module (e.g., behavior based analysis module 154 of server 140A). Servers 140A and 140B may be communicatively coupled to a SAN (Storage Area Network) fabric 170. SAN fabric 170 may support access to storage devices 180(1)-(N) by servers 140A and 140B, and by client systems 110, 120 and 130 via network 150. Server 140A may be communicatively coupled to network 190.

The description below describes network elements, computers, and/or components of a system and method for behavior based malware analysis that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Figure 2:
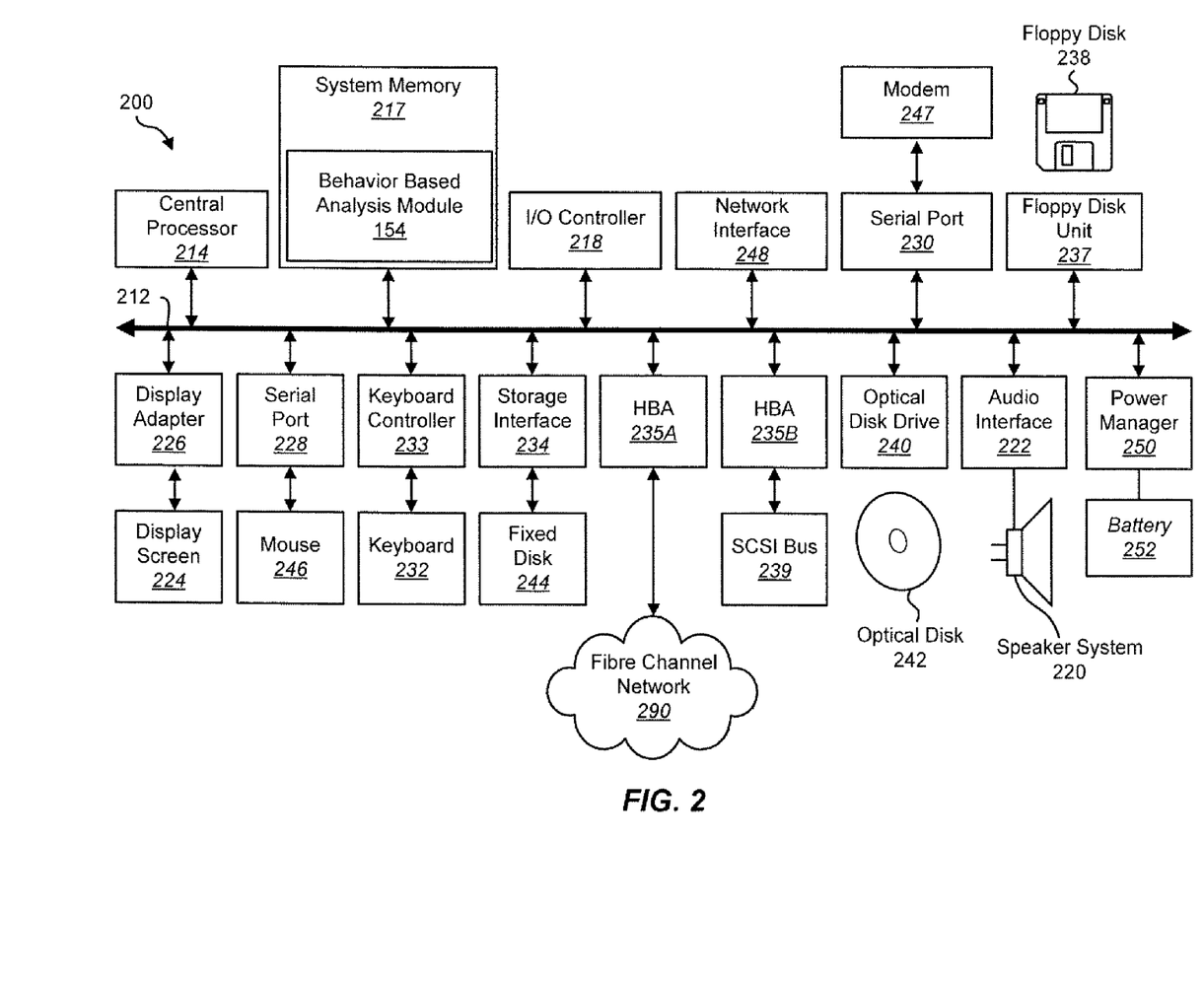
FIG. 2 depicts a block diagram of a computer system in accordance with an embodiment of the present disclosure.

With reference to computer system 200 of FIG. 2, modem 247, network interface 248, or some other method may be used to provide connectivity from one or more of client systems 110, 120 and 130 to network 150. Client systems 110, 120 and 130 may be able to access information on server 140A or 140E using, for example, a web browser or other client software. Such a client may allow client systems 110, 120 and 130 to access data hosted by server 140A or 140B or one of storage devices 160A(1)-(N), 160B(1)-(N), and/or 180(1)-(N).

Networks 150 and 190 may be local area networks (LANs), wide area networks (WANs), the Internet, cellular networks, satellite networks, or other networks that permit communication between clients 110, 120, 130, servers 140, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180(1)-(N) may be network accessible storage and may be local, remote, or a combination thereof to server 140A or 140B. Storage devices 160A(1)-(N), 160B(1)-(N), and/or 180(1)-(N) may utilize redundant array of inexpensive disks ("RAID"), magnetic tape, disk, a storage area network ("SAN"), an Internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup or archival purposes.

According to some embodiments, clients 110, 120, and 130 may be smartphones, PDAs, desktop computers, laptop computers, servers, other computers, or other devices coupled via a wireless or wired connection to network 150. Clients 110, 120, and 130 may receive data from user input, a database, a file, a web service, and/or an application programming interface.

Servers 140A and 140B may be application servers, archival platforms, backup servers, network storage devices, media servers, email servers, document management platforms, enterprise search servers, or other devices communicatively coupled to network 150. Servers 140A and 140B may utilize one of storage devices 160A(1)-(N), 160B(1)-(N), and/or 180(1)-(N) for the storage of application data, backup data, or other data. Servers 140A and 140B may be hosts, such as an application server, which may process data traveling between clients 110, 120, and 130 and a backup platform, a backup process, and/or storage. According to some embodiments, servers 140A and 140B may be platforms used for backing up and/or archiving data. One or more portions of data may be backed up or archived based on a backup policy and/or an archive applied, attributes associated with the data source, space available for backup, space available at the data source, or other factors.

According to some embodiments, clients 110, 120, and/or 130 may contain one or more portions of software for behavior based malware analysis such as, for example, behavior based analysis module 154. As illustrated, one or more portions of behavior based analysis module 154 may reside at a client. One or more portions of behavior based analysis module 154 may reside at a network centric location. For example, server 140A may be a server, a firewall, a proxy server, a gateway, a search engine, or other network element that may perform one or more actions to analyze one or more behaviors. According to some embodiments, network 190 may be an external network (e.g., the Internet) and server 140A may be a gateway, a proxy server, a search engine, and/or a firewall between one or more internal components and clients and the external network.

According to some embodiments, behavior based analysis module 154 may be implemented in several portions which may be co-located or located remote from one another. According to one or more embodiments, behavior based analysis may be performed by a third party (e.g., a service provider and/or a security software vendor). Results of behavior based analysis may be provided to one or more clients.

According to some embodiments, clients 110, 120, and/or 130 may contain one or more modules of behavior based analysis module 154. If a process, file, and/or data is indicated as malicious one or more modules of behavior based analysis module 154 residing on a client may deny access to the malware associated content, may provide a warning associated with the malware associated content, and/or may activate security software to address a malware threat. For example, a component of behavior based analysis module 154 may perform one or more actions to protect a user from detected malware. According to some embodiments, behavior based analysis module 154 may identify other patterns of behavior in addition to or instead of malware behavior patterns. For example, behavior based analysis module 154 may identify program bugs, hardware failures, network anomalies, and other patterns for which rules may be provided to match against a plurality of observable events. Behavior based analysis module 154 analyze events associated with different platforms, components, and/or processes (e.g., a program, hardware component, a network element, a computer, and/or a portable client device. Behavior based analysis module 154 may allow the nesting of identified actions and/or events to match against a complex rule set. For example, a lowest level of observable events may be considered the leaves of a rule tree (e.g., system calls). A plurality of these lowest level observable events may be matched against a rule to identify a next level action. A plurality of next level actions may be matched to perform a higher level action. Levels of matching may continue until high level behaviors are identified. Levels of abstraction may depend on a platform, system, component, and/or process being analyzed as well as a rule set and other factors.

Behavior based analysis module 154 may extract high level behaviors for malware analysis, according to some embodiments. behavior based analysis module 154 may provide a systematic malware analysis approach to understand high-level behaviors such as, for example, self-copying, disabling security services, enumerating processes, and so on. According to one or more embodiments, behavior based analysis module 154 may specify and match signatures of high-level behaviors using a logic programming paradigm. The declarative and expressive power of a logic language may allow writing specifications of complex high-level behaviors. Behavior based analysis module 154 may generate proof of signature matching for in-depth understanding of malware behaviors.

As a part of backend malware analysis process, malware analysts may perform analysis of samples (program executables) to determine if they are malware. On the Windows platform, for example, this may involve observing security sensitive Windows API-level operations. Capturing individual API-level behaviors may not be sufficient. Although useful, individual APIs may provide an overwhelming amount of information to malware analysts and/or automated programs for them to analyze and make timely decision. To add to this problem, API interfaces, such as the one on the Windows platform, may be fairly complex, consisting of a large set of interesting APIs, many of them with complex types of arguments and some that even share or duplicate functionality. Behavior based analysis module 154 may provide a systematic approach to extract high-level behaviors, which may be easy for comprehension. Behavior based analysis module 154 may allow the specification of signatures of high-level behaviors using a Horn clause-based logic language such as, for example, Prolog. Behavior based analysis module 154 may also match signatures against observable behavior (e.g., API traces) to generate proof of matches. Behavior based analysis module 154 may also generate output of one or more high level behaviors (e.g., HTML reports showing summary of one or more matched behaviors in the form of English language description.)

According to some embodiments, behavior based analysis module 154 may receive or generate a trace file which may comprise system observable events including, but not limited to, system calls, execution history, and/or API calls produced during the execution of suspected malware. System observable events may include one or more platforms, components, and/or processes including, for example, a computer, an operating system, a network, a hardware component, a program, and/or a process. A trace file may include data from logs such as, for example, a system log, an HTTP access log, and a network activity log. According to some embodiments, a trace file may be obtained using one or more debug techniques and/or tools.

According to an embodiment, an API trace may include a listing of a sequence of APIs that are invoked from one or more processes and/or remotely injected threads resulting from the execution of a sample of suspected malware. An observable event (e.g., an API call) in a trace file may be represented as a fact of the form (e.g., event(proc_id, thread_id, seq_num, api_name(args))). The return value may be captured as the last argument and arguments of complex data types such as structures and unions may be encoded as arrays. The fact may include context information such as process id, thread id, and/or a sequence number to indicate ordering among observable events (e.g., API calls). According to an exemplary embodiment, trace files may be generated by running suspected malware in a safe environment (e.g., a sandboxed virtual machine).

Behavior based analysis module 154 may represent a behavior signature in the form of a Horn clause rule: Goal:—Body. A Goal may represent a high-level operation and a Body may represent a combination of low-level operations. Semantically, the rule may indicate that if a Body is true, a Goal may be true. A Body may be a Boolean expression representing conjunction (',') or disjunction (';') of sub-goals. At a high level, each rule can be visualized as an And/Or tree, where the root may be the main goal, leaves may be facts, and the intermediate nodes may be Boolean conditions over sub-goals and argument values. Representation of rules may allow recognition of observable events (e.g., API calls, system calls, network events, etc).

An exemplary rule that may capture various ways of performing a CreateMutex operation is: napi_CreateMutex(MutexName, Handle):— api_CreateMutexA(_, _, MutexName, Handle);

api_CreateMutexW(_, _, MutexName, Handle);

api_CreateMutexExA(_, MutexName, _, _, Handle);

api_CreateMutexExW(_, MutexName, _, _Handle).

As illustrated by the above exemplary rule, captured observable event information such as, for example, API call information, may be normalized. Behavior based analysis module 154 may include or utilize a rule library consisting of normalization of many commonly occurring observable events (e.g., frequently called APIs). In the exemplary rule, unbound variables MutexName and Handle are assigned values from the facts in case of a match. Uninteresting arguments, indicated by '_', may be ignored. Behavior based analysis module 154 may capture observable event correlations using conjunctions. For example, a series of operations to add a program to the "Run" registry key including a registry key open operation, a set the registry key value operation, and a condition to check if the key is "Run" registry key may be expressed as: setRunKey(AppName, ExePath):— napi_RegkeyOpen(KeyName, Handle), napi_RegkeySetValue(Handle, AppName, ExePath), str_eq('SOFTWARE\\Microsoft\\Windows\\CurrentVersion\\Run', KeyName).

Note that equality of the handle value may be captured by the use of the same variable in the two sub-goal operations.

Behavior based analysis module 154 may use rules to identify observable events to identify one or more high level behaviors. Malware analysts and/or malware security software may want to identify the specific actions, e.g., APIs along with their arguments, which lead to the high-level behaviors. Behavior based analysis module 154 may use a meta-interpretation approach to provide this. For every matched signature, behavior based analysis module 154 may generate a proof in the form of a complete rule tree, or simply the leaf-level nodes representing, for example, the APIs involved in the match. An exemplary rule and its corresponding matching proof may be: mbs_InjectThread(procName):— napi_ProcessOpenByName(ProcName, _, ProcHandle), napi_WriteProcessMemory(ProcHandle, _, napi_CreateRemoteThread(ProcHandle, _).

The exemplary proof matching the above rule in the form of leaf level APIs may be:

1. api Process32Next(0x1001, [296, 0, 1588, 0, 0, 16, 1552, 8, 0, 'explorer.exe'], 1)
2. api_OpenProcess(2035771, 0, 1588, 0x1002)
3. api WriteProcessMemory(0x1002, 0xE30000, [67, 68, . . . , ], 4096, 4096, 1)
4. apiCreateRemoteThread(0x1002, 0, 0, 0x7C801D77, 0xE30000, 0, 788, 17548)

The exemplary rule above may be used to identify process injection into Microsoft Windows Explorer. The process injection may be used to provide memory space of a running process (e.g., Microsoft Explorer) to run malware (e.g., a non-process threat). Hiding execution of the malware process within the memory space of an approved program (an installed word processor, Internet browser, etc.) may protect the malware from detection by prior security software analysis programs. Behavior based analysis module 154 may correctly identify malware threats by identifying behaviors which may be linked together by context. Behavior based analysis module 154 may detect the instantiation of a malware program that injects a process into the address space of a legitimate program and subsequently deletes the malware file to attempt to hide the attack. By linking the API calls together using context (e.g., arguments, sequence, thread id, etc.), the process within the legitimate program's address space may be identified and linked to an instantiating malware file and/or process.

According to some embodiments, behavior based analysis module 154 may also use meta-interpretation to automatically ensure that context information is utilized in analyzing malware. Context enforcement may avoid spurious matches or incorrect matches (e.g., accidently matching equality of handle values across operations belonging to multiple processes—which may result in incorrectly associating an operation of a second process with a first process). Context information may include argument values (e.g., file handles, process handles, etc.) Context information may also include identifiers such as, for example, thread identifiers and/or process identifiers. Context information may include time stamps. Behavior based analysis module 154 may use timestamps associated with a trace file to determine a sequence of observable events (e.g., API calls or system calls). Using meta-interpretation, behavior based analysis module 154 may infer context based on an observable event argument type (e.g., handle values require process context, whereas file names do not), and then automatically match signatures only within a valid context. For example, if a signature associated with a rule requires opening an operating system file, writing to the file, and closing the file, automatic enforcement of the context may ensure that a process associated with malware is performing all three steps. Without the context, a second unrelated process writing to the same operating system file may cause the signature to be incorrectly matched. Automatic context enforcement (e.g., arguments or identifiers to ensure that API calls are related) may make signatures simpler and context-agnostic.

Behavior based analysis module 154 may provide a tool for thorough understanding of malware behavior for malware analysis. High-level behavior information may improve efficiency of malware analysis by programs or individuals to identify programs as malware and to distribute signatures. Behavior based analysis module 154 may allow specification of signatures of new interesting process behaviors. Behavior based analysis module 154 may provide high-level behaviors for better organization and cataloging of malware samples into more meaningful behavior-based categories such as rootkits, keyloggers, bots, etc. According to some embodiments, Behavior based analysis module 154 may allow identification of a non-process threat. Non-process threats may use existing benign processes and/or utilities to perform one or more malicious actions. For example, a non-process threat may execute and inject code into an memory space of an existing process associated with a benign process. The non-process threat may then create a remote thread associated with the benign process to perform one or more malicious actions. Behavior based analysis module 154 may allow and/or provide sharing threat behaviors, behavior based signatures, hash signatures, and/or security measures with customers and/or partners.

According to some embodiments, behavior based analysis module 154 may provide not only resource usage information, but also provide information about in-depth high-level behaviors that spread across multiple APIs. Behavior based analysis module 154 may provide automated context enforcement and proof generation. Behavior based analysis module 154 may use state variables which may be capable of capturing many more interesting high-level behaviors than regular expressions or finite state automata.

According to some embodiments, behavior based analysis module 154 may provide a summary of high level behaviors extracted from a trace file. According to some embodiments, behavior based analysis module 154 may only provide high level behaviors corresponding to one or more provided signatures. For example, a user or process may utilize behavior based analysis module 154 to generate a report of high level actions associated with a suspected malware sample. A user or process may also provide one or more signatures (e.g., patterns of high level behavior) and behavior based analysis module 154 may determine if one or more portions of one or more high level behaviors match the one or more provided signatures. According to some embodiments, behavior based analysis module 154 may match one or more extracted high level behaviors against a plurality of signatures to identify and/or classify a malware sample. For example, a signature (e.g., a rule set identifying one or more high level behaviors) may be used to classify malware into a family of threats. This may help identify the malware as a variant of a known threat for which there are security measures and/or remedies.

FIG. 2 depicts a block diagram of a computer system 200 in accordance with an embodiment of the present disclosure. Computer system 200 is suitable for implementing techniques in accordance with the present disclosure. Computer system 200 may include a bus 212 which may interconnect major subsystems of computer system 200, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM may be the main memory into which the operating system and application programs may be loaded. The ROM or flash memory can contain, among other code, the Basic Input-Output system (BIOS) which controls basic hardware operation such as the interaction with peripheral components. Applications resident with computer system 200 may be stored on and accessed via a computer readable medium, such as a hard disk drive (e.g., fixed disk 244), an optical drive (e.g., optical drive 240), a floppy disk unit 237, or other storage medium. For example, behavior based analysis module 154 may be resident in system memory 217.

Storage interface 234, as with the other storage interfaces of computer system 200, can connect to a standard computer readable medium for storage and/or retrieval of information, such as a fixed disk drive 244. Fixed disk drive 244 may be a part of computer system 200 or may be separate and accessed through other interface systems. Modem 247 may provide a direct connection to a remote server via a telephone link or to the Internet via an Internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 200 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3:
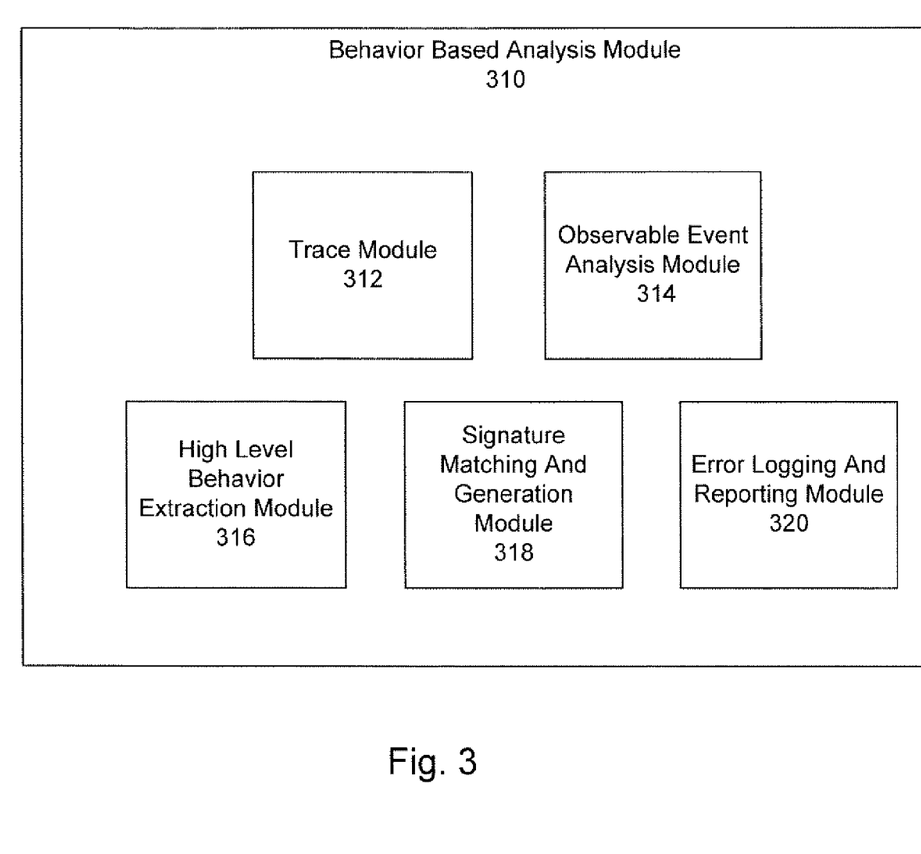
FIG. 3 shows a module for behavior based malware analysis in accordance with an embodiment of the present disclosure.

Referring to FIG. 3, there is shown a behavior based analysis module 310 in accordance with an embodiment of the present disclosure. As illustrated, the behavior based analysis module 310 may contain one or more components including Trace Module 312, Observable Event Analysis Module 314, High Level Behavior Extraction Module 316, Signature Matching And Generation Module 318, and error logging and reporting module 320.

Trace Module 312 may generate a trace file which may comprise system observable events including, but not limited to system calls, execution history, and/or API calls produced during the execution of suspected malware. System observable events may include one or more platforms, components, and/or processes including, for example, a computer, an operating system, a network, a hardware component, a program, and/or a process. A trace file may include data from logs such as, for example, a system log, an HTTP access log, and a network activity log. According to some embodiments, a trace file may be obtained using one or more debug techniques and/or tools. According to an embodiment, a trace file may list API calls during execution of a malware sample. According to some embodiments, a malware sample may be executed in a safe environment such as, for example, a sandboxed virtual machine. According to one or more embodiments, Trace Module 312 may generate trace files of a client or server running in a production environment. Trace Module 312 may also provide traces of programs for analysis by copying and/or intercepting programs at a firewall, proxy server, or another intermediary device. According to one or more embodiments, Trace Module 312 may provide formatting and/or processing on a generated trace file. For example, Trace Module 312 may normalize one or more API calls (e.g., remove arguments with little or no significance for analysis). Trace Module 312 may also ensure that context indicators are available and/or consistent for evaluation (e.g., ensure that handles are unique across a trace so that unrelated handles with a same value are not associated together).

Observable Event Analysis Module 314 may analyze one or more observable events (e.g., API calls, system calls, log entries, etc.) to identify low level actions. Observable Event Analysis Module 314 may contain and/or access one or more rules mapping observable events to low level actions. For example, Observable Event Analysis Module 314 may use disjunctive pattern matching among normalized APIs to identify one or more low level actions such as opening a file, writing to a file, and/or closing a file. Matching rules to actions may be contained by other logic such as, for example, logic limiting an amount of recursion necessary or logic which stops searching for a match after a first match is found. In some embodiments, all possible matches may be found.

High Level Behavior Extraction Module 316 may contain and/or access one or more rules to identify patterns of low level actions which correspond to high level behaviors. High level behaviors may correspond to behaviors associated with malicious, unauthorized, and/or undesired behaviors. For example, High Level Behavior Extraction Module 316 may identify several low level actions as corresponding to one or more of: injecting a process thread, downloading malware, disabling security software, hiding information associated with a process, stealing information, a process monitoring itself, creating a backdoor, executing malware, and/or a process setting up instantiations of itself. According to some embodiments, high level behaviors may be any high level behaviors and other logic and/or a manual review may determine the nature of the high level behaviors. High Level Behavior Extraction Module 316 may abstract low level actions to ignore unimportant details and may correlate a plurality of low level behaviors to identify one or more high level behaviors.

Rules and/or analysis may allow for multiple levels of nesting at a high level and/or low level.

Signature Matching And Generation Module 318 may accept or access one or more signatures for matching against one or more identified high level actions. Signature Matching And Generation Module 318 may also generate signatures for one or more high level actions corresponding to malware. Signature Matching And Generation Module 318 may generate proofs which may provide an output of matching API calls to one or more high level behaviors.

Error logging and reporting module 320 may produce logs, reports, or other information associated with behavior based malware analysis.

Figure 4:
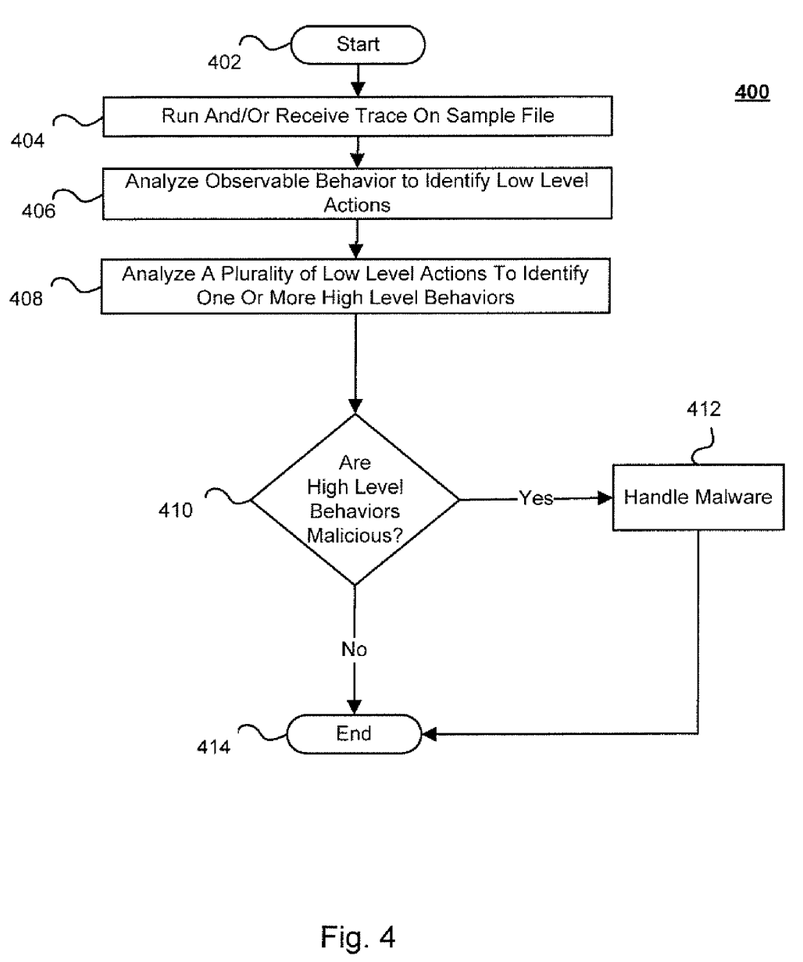
FIG. 4 depicts a method for behavior based malware analysis in accordance with an embodiment of the present disclosure.

Referring to FIG. 4, there is depicted a method 400 for behavior based malware analysis in accordance with an embodiment of the present disclosure. At block 402, the method 400 may begin.

At block 404, the method may receive and/or run a trace file on a sample file. A trace file may comprise system observable events including, but not limited to system calls, execution history, and/or API calls produced during the execution of suspected malware. System observable events may include one or more platforms, components, and/or processes including, for example, a computer, an operating system, a network, a hardware component, a program, and/or a process. A trace file may include data from logs such as, for example, a system log, an HTTP access log, and a network activity log. According to some embodiments, a trace file may be obtained using one or more debug techniques and/or tools. According to some embodiments, an API trace may be performed using a user level hook in a secure environment such as a sandboxed virtual machine. A trace file may be normalized and/or further prepared for analysis.

At block 406, observable system events (e.g., one or more API calls, one or more system calls, log files, etc.) may be analyzed to identify low level actions using one or more rules. Rules may specify disjunctive conditions allowing for alternative observable events (e.g., API calls, system calls, log entries, etc.) to match a same low level action. Rules may also specify conjunctive actions requiring a plurality of observable events (e.g., API calls, system calls, log entries, etc.) to match a low level action. One or more attributes associated with the observable events (e.g., the sequence of API calls, API arguments, and/or the context of an API) may be used to determine whether a low level action has been identified.

At block 408, a plurality of low level actions may be matched using one or more rules to a high level action. According to some embodiments, a plurality of levels may be nested and/or block 408 may be iterated multiple times. For example, a number of system calls, API calls, log entries, and/or other observable events may be identified to perform a low level action. A plurality of low level actions may be identified as performing one or more middle level actions. A plurality of middle level actions may be identified as performing a high level action.

At block 410, one or more high level behaviors may be analyzed. High level behaviors may be analyzed individually or in relation to other high level behaviors (e.g., a single high level behavior may be benign or may not have significance, but a plurality of high level behaviors in a particular sequence may perform malicious behaviors). According to some embodiments, analysis of high level behaviors may be performed manually (e.g., by a service provider analyst reviewing output of high level behaviors). According to some embodiments, analysis of high level behaviors may be performed by automated techniques (e.g., machine learning). According to some embodiments, high level behaviors may be analyzed to identify characteristics other than malicious behavior. For example, high level behavior may be analyzed to identify program bugs, hardware failures, network anomalies, or other patterns of behavior. It may be determined whether high level behaviors are malicious. If one or more high level behaviors are malicious, the method may continue at block 412. If the one or more high level behaviors are not malicious the method may end at block 414.

At block 412, identified malware may be handled. For example, a signature file may be generated and distributed to facilitate identification of the malware.

At block 414, the method may end.

Figure 5:
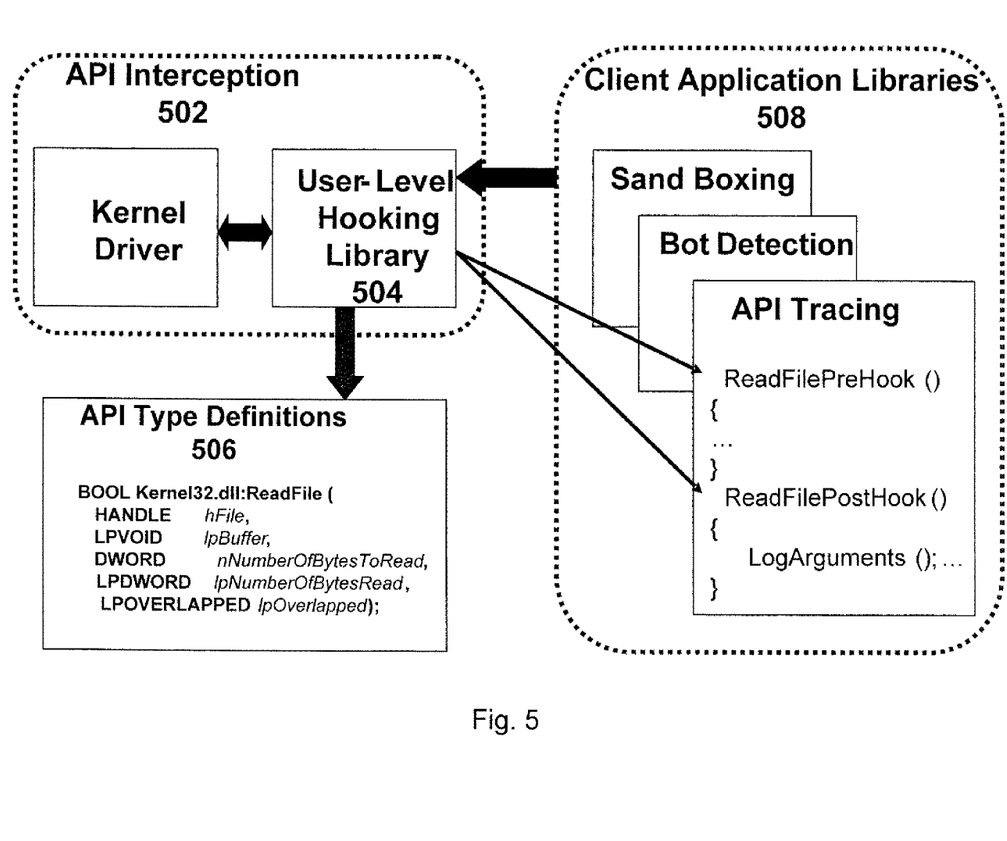
FIG. 5 depicts a block diagram for API tracing in accordance with an embodiment of the present disclosure.

FIG. 5 depicts a block diagram for API tracing in accordance with an embodiment of the present disclosure. As described above, other system, network, process, and/or component observable events may be used to analyze behavior. Observable behavior may be received and/or captured via a plurality of techniques. API tracing may be understood to be utilized in one or more exemplary embodiments. In other embodiments, other techniques for obtaining observable event information may be utilized (e.g., log files, SNMP information, debugging techniques, etc.) As illustrated, API Interception 502 may provide a framework for intercepting API calls in order to provide a trace. API Interception 502 may provide pre-hook functions and/or post-hook functions. User-level hooking library 504 may use client application libraries 508 for API tracing, sand boxing, and BOT detection. User-level hooking library 504 may use API Type Definitions 506 to identify different types of APIs to trace.

Figure 6:
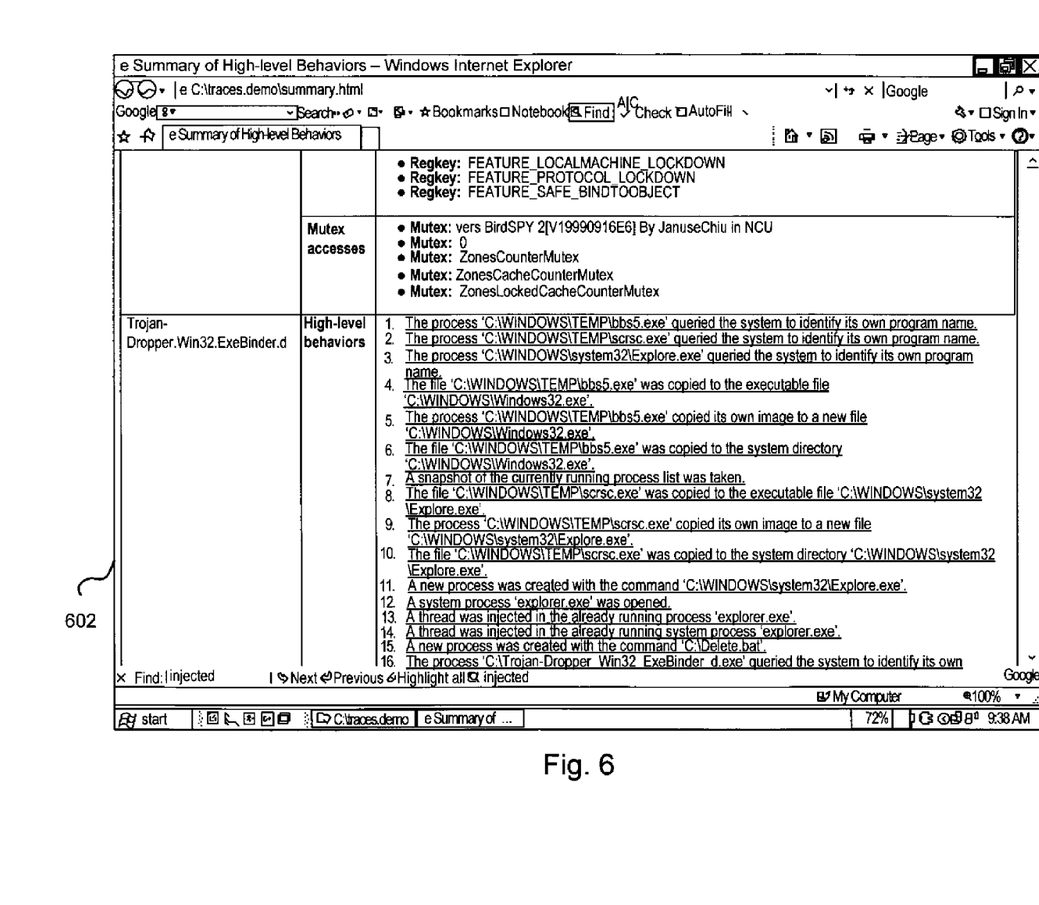
FIG. 6 depicts a user interface for reporting malware behavioral analysis in accordance with an embodiment of the present disclosure.

FIG. 6 depicts a user interface for reporting malware behavioral analysis in accordance with an embodiment of the present disclosure. Interface 602 may display high level behaviors associated with a malware sample. High level behaviors may be given a descriptive summary providing an easy to understand consequence or result of the behaviors. According to some embodiments, it may be possible to drill down by clicking on a URL to obtain more trace file information associated with one or more high level behaviors.

Figure 7:
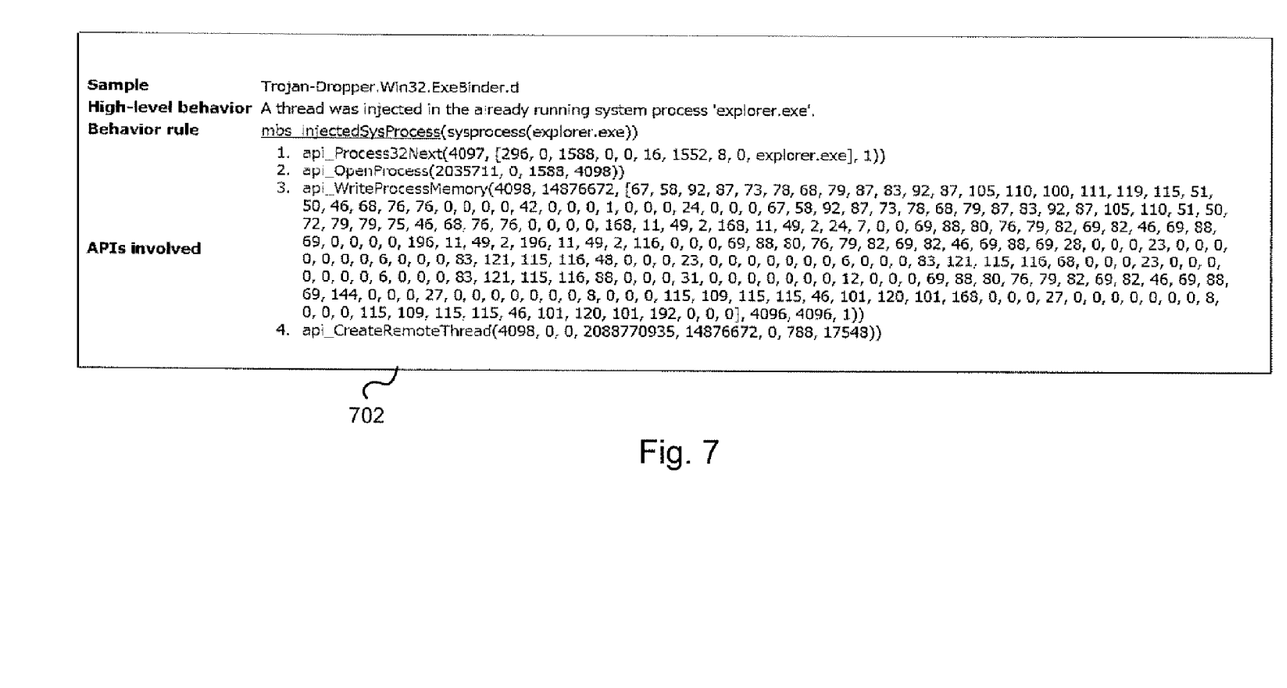
FIG. 7 depicts a user interface for displaying a proof of behavioral matching in accordance with an embodiment of the present disclosure.

FIG. 7 depicts a user interface for displaying a proof of behavioral matching in accordance with an embodiment of the present disclosure. Interface 702 displays a plurality of APIs that were traced and mapped to a high level behavior. The exemplary high level behavior is "[a] thread was injected in the already running system process 'explorer.exe'." This is associated with four APIs listed and a behavioral rule. The API arguments are provided. According to some embodiments, it may be possible to drill down by clicking on a URL to obtain more trace file information and/or to edit a rule.

At this point it should be noted that behavior based malware analysis in accordance with the present disclosure as described above typically involves the processing of input data and the generation of output data to some extent. This input data processing and output data generation may be implemented in hardware or software. For example, specific electronic components may be employed in a behavior based analysis module or similar or related circuitry for implementing the functions associated with behavior based analysis in accordance with the present disclosure as described above. Alternatively, one or more processors operating in accordance with instructions may implement the functions associated with behavior based analysis in accordance with the present disclosure as described above. If such is the case, it is within the scope of the present disclosure that such instructions may be stored on one or more processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein,

The invention claimed is:

1. A computer-implemented method for behavior based analysis comprising:
   generating trace data associated with execution of a process, wherein generating trace data comprises using user level hooks to monitor execution of a suspected malware program in a safe environment;
   preprocessing the trace data to provide consistent context indicators for analysis of the trace data
   analyzing, using at least one computer processor, observable events via the trace data to identify a plurality of low level actions;
   analyzing the plurality of low level actions to identify at least one high level behavior; and
   providing an output of the at least one high level behavior.

2. The computer-implemented method of claim 1, wherein analyzing observable events comprises analyzing low level Application Programming Interface calls using at least one rule to identify a low level action performed by a low level Application Programming Interface call.

3. The computer-implemented method of claim 2, wherein the observable events comprise one or more of: system calls, execution history, API calls, a system log, a debug log, an HTTP access log, and a network activity log.

4. The computer-implemented method of claim 1, wherein analyzing a plurality of low level actions to identify at least one high level behavior comprises using at least one rule to identify the at least one high level behavior.

5. The computer-implemented method of claim 1, further comprising:
   automatically determining if the trace data is associated with malware based at least in part on the at least one high level behavior.

6. The computer-implemented method of claim 4, further comprising generating a signature associated with the trace data in the event the trace data is determined to be malware.

7. The computer-implemented method of claim 5, wherein the at least one high level behavior comprises at least one of: hiding information associated with the process, stealing information, terminating security software, monitoring itself, creating a backdoor, downloading malware, executing malware, and setting up instantiations of itself.

8. The computer-implemented method of claim 1, wherein analyzing observable events comprises identifying a context of observable events and analyzing only observable events associated with the trace data.

9. The computer-implemented method of claim 8, wherein identifying the context of observable events provides identification of malicious behavior performed by one or more of: a non-process threat, a malware executable, a child process, and an injected thread.

10. The computer-implemented method of claim 8, wherein the context is identified using at least one of: a process thread, a process id, a thread id, a timestamp, and one or more API arguments.

11. The computer-implemented method of claim 10, wherein identification of the context prevents association of an operating system utility exploited by malware and provides association of the high level behavior with a source utilizing the operating system utility.

12. The computer-implemented method of claim 11, wherein the operating system utility comprises a utility to perform one or more of: loading a DLL, injecting a remote process thread, running an executable, running a service, and adding a program to a Run registry key.

13. The computer-implemented method of claim 1, further comprising:
generating a proof associating one or more observable events with the identified at least one high level behavior.

14. The computer-implemented method of claim 1, wherein providing an output of the at least one high level behavior comprises at least one of: providing a report of high level behavior, generating an alert, and generating a log entry.

15. The computer-implemented method of claim 1, further comprising:
further comprising matching one or more signatures of malware behavior to identify high level behavior.

16. The computer-implemented method of claim 1, wherein one or more analysis actions are performed by at least one of: a gateway, a proxy server, a client, a service provider, and a firewall.

17. At least one processor readable non-transitory storage medium for storing a computer program of instructions configured to be readable by at least one processor for instructing the at least one processor to execute a computer process for performing the computer-implemented method as recited in claim 1.

18. An article of manufacture for behavior based analysis, the article of manufacture comprising:
at least one non-transitory processor readable medium; and
instructions stored on the at least one medium;
wherein the instructions are configured to be readable from the at least one medium by at least one processor and thereby cause the at least one processor to operate so as to:
generate trace data associated with execution of a process, wherein generating trace data comprises using user level hooks to monitor execution of a suspected malware program in a safe environment;
preprocess the trace data to provide consistent context indicators for analysis of the trace data
analyze observable events via the trace data to identify a plurality of low level actions;
analyze the plurality of low level actions to identify at least one high level behavior; and
provide an output of the at least one high level behavior.

19. A system for behavior based analysis comprising:
one or more processors communicatively coupled to a network; wherein the one or more processors are configured to:
generate trace data associated with execution of a process, wherein generating trace data comprises using user level hooks to monitor execution of a suspected malware program in a safe environment;
preprocess the trace data to provide consistent context indicators for analysis of the trace data
analyze observable events via the trace data to identify a plurality of low level actions;
analyze the plurality of low level actions to identify at least one high level behavior; and
provide an output of the at least one high level behavior.

* * * * *